United States Patent
Latarnik et al.

(10) Patent No.: US 6,526,334 B1
(45) Date of Patent: Feb. 25, 2003

(54) METHOD OF CONTROLLING VEHICLE HANDLING

(75) Inventors: Michael Latarnik, Friedrichsdorf (DE); Helmut Fennel, Bad Soden (DE)

(73) Assignee: Continental Teves AG & Co., OHG, Frankfurt (DE)

(*) Notice: Subject to any disclaimer, the term of this patent is extended or adjusted under 35 U.S.C. 154(b) by 129 days.

(21) Appl. No.: 09/202,412
(22) PCT Filed: Jun. 13, 1997
(86) PCT No.: PCT/EP97/03102
§ 371 (c)(1), (2), (4) Date: Mar. 23, 1999
(87) PCT Pub. No.: WO97/47485
PCT Pub. Date: Dec. 18, 1997

(30) Foreign Application Priority Data

Jun. 13, 1996 (DE) .......................... 196 23 595

(51) Int. Cl.⁷ .............................. G06F 7/70; G06G 7/76
(52) U.S. Cl. ................. 701/1; 701/70; 701/72
(58) Field of Search .............. 701/1, 70, 71, 701/72, 78, 36, 37, 83, 74; 303/146, 147, 148, 149, 189, 186, 165, 163; 180/197, 199, 422; 702/148, 150

(56) References Cited

U.S. PATENT DOCUMENTS

| | | | |
|---|---|---|---|
| 5,136,513 A | * | 8/1992 | Sol et al. ...................... 701/70 |
| 5,275,475 A | * | 1/1994 | Hartmann et al. ............. 701/72 |
| 5,408,411 A | * | 4/1995 | Nakamura et al. ............ 701/48 |
| 5,548,536 A | * | 8/1996 | Ammon ...................... 702/148 |
| 5,556,176 A | * | 9/1996 | Bosch et al. ................. 303/165 |
| 5,694,319 A | * | 12/1997 | Suissa et al. .................. 701/72 |
| 5,701,248 A | * | 12/1997 | Wanke ......................... 701/72 |
| 5,732,377 A | * | 3/1998 | Eckert .......................... 701/78 |
| 5,774,821 A | * | 6/1998 | Eckert .......................... 701/78 |
| 5,790,970 A | * | 8/1998 | Brackert et al. .............. 701/70 |
| 5,826,204 A | * | 10/1998 | Ulm ............................. 701/72 |
| 5,862,503 A | * | 1/1999 | Eckert et al. ................. 701/78 |
| 5,964,819 A | * | 10/1999 | Naito ........................... 701/72 |

FOREIGN PATENT DOCUMENTS

EP          04 44 109          9/1991

* cited by examiner

Primary Examiner—Jacques Louis Jaques
(74) Attorney, Agent, or Firm—Rader, Fishman & Grauer PLLC

(57) ABSTRACT

The present invention provides a process for controlling the driving behavior of an automotive vehicle which determines from tire sensing signals at least the vehicle mass and the momentary location of the mass center of gravity of the automotive vehicle. According to another embodiment of the invention the use of a mass distribution model is suggested containing, as the basic data, the basic mass distribution of the vehicle, namely such masses that are always identical even if the loading is different. Moreover, variable masses, such as location and mass of passengers, luggage etc., are determined from the tire sensing signals and are incorporated into the mass distribution model to provide a variable mass distribution. With such such data being known, also details typical of the driving dynamics of the vehicle can be determined so that yawing angle speed and side slip angle of the vehicle can be computed accordingly with no need of relying on the signals of a yaw rate sensor or a transverse acceleration sensor.

6 Claims, 2 Drawing Sheets

METHOD OF CONTROLLING VEHICLE HANDLING

TECHNICAL FIELD

The present invention relates to a process for controlling the driving behavior of an automotive vehicle.

BACKGROUND OF THE INVENTION

A process of the afore-mentioned type is generally disclosed, for example, in EP 04 441 09 B1. The automotive vehicle with which the conventional process is employed includes, in addition to tire sensors for detecting the forces and moments applied to the tires, a sensor for determining the acceleration in the center of gravity, wheel sensors for detecting the circumferential speed of the individual wheels and a height sensor for determining the condition of the wheel suspension. The use of a sensor for determining the acceleration of the center of gravity requires that the center of gravity of the automotive vehicle is known. However, an automotive vehicle is always exposed to different strain and loading so that the center of gravity, on the one hand, varies due to the inherent movements of the vehicle such as diving or waving motions and, on the other hand, due to different loads. Consequently, a calculation of the vehicle dynamics based on a static center of gravity of the automotive vehicle will not provide accurate values.

U.S. Pat. No. 5,136,513 discloses a method of calculating the vehicle mass and the vehicle center of gravity. The method uses a number of sensors such as a travel sensor or acceleration sensor to determine a location shift, at least one load sensor on the vehicle suspension to determine the vehicle mass as well as a rotation sensor to measure the mass shift during cornering.

It is the object of the present invention to provide a process of the afore-mentioned type permitting a more reliable determination of the vehicle dynamics and requiring only negligible additional sensing efforts.

The principle underlying the invention resides in determining the actual center of gravity of the automotive vehicle from the signals generated by the tire sensor, and in detecting at least the vehicle mass. This process provides actual reference values variable in relation to time, describing the actual driving condition of the automotive vehicle more accurately.

The control quality of a process of this type will be further improved if the automotive vehicle is not statically determined as a pointed mass but rather as a body of finite expansion. Integrated into such a mass distribution model are known masses provided on the automotive vehicle, such as engine, gear box, body and the like spatially distributed items. For example, the vehicle can be described to be a static body suspended from four springs.

To determine the actual mass distribution, additional variable mass can be added to the basic distribution of the mass through the tire sensor signals, with the model, for simplifying purposes, being able to provide additional mass on typical points of load only. Typical points of load are, for example, vehicle seats, luggage compartment and, optionally, the vehicle roof.

The calculation will be particularly simple if the additional masses are defined as mass points located at the centers of gravity of the typical loading sites. These are, for example, the mass center of gravity of an average driver's body, the center of the bottom of the luggage compartment or the like.

Assuming a static body of a predetermined mass distribution will better mirror real conditions at least in respect of a roof rack load, as in roof loadings, depending on the height of the load, the center of gravity of the vehicle is more or less shifted upwardly, with the aerodynamic drag of the automotive vehicle increasing.

As in view of the tire sensing system the load on the individual wheels is known and, in addition, the center of gravity of the mass is determined, the behavior of the vehicle, under predetermined conditions, can be easily reproduced. It is possible, for example, to compute the lateral guiding force that can be generated by a predetermined wheel when driving through a special curve.

However, it is also possible to determine—with the aid of the mass distribution model—the momentary driving condition, with no excessively precise computation of the nominal value being required so that also a linear one-track model or the like can by all means be used.

DETAILED DESCRIPTION OF THE PREFERRED EMBODIMENTS

Figure 1A:
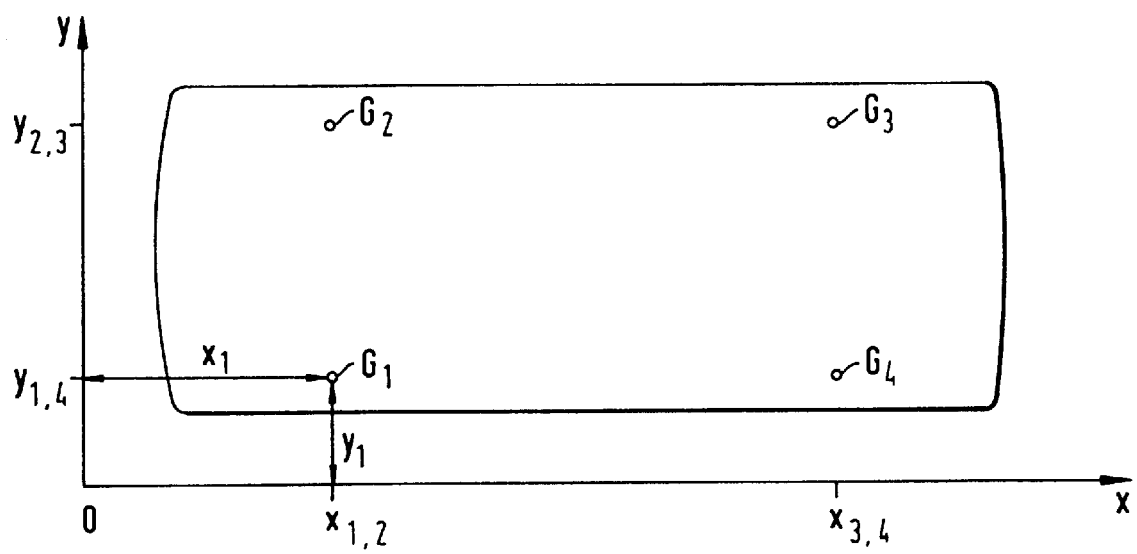
FIG. 1 schematically shows a vehicle to which the process of the invention can be applied.
Figure 1B:
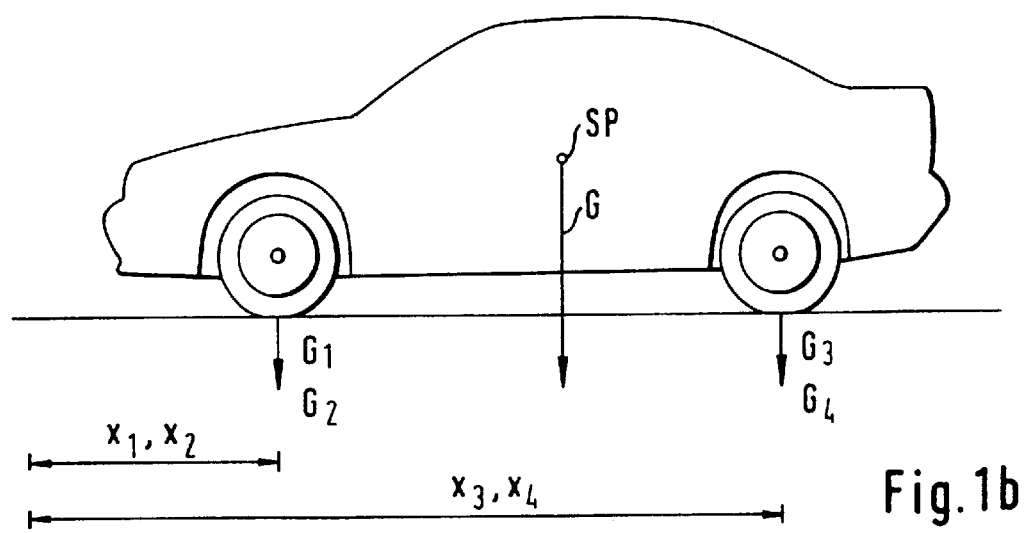

FIG. 1 is subdivided into FIGS. 1a and 1b. FIG. 1a schematically shows a plan view of a vehicle, illustrating the geometrical position of the wheel bearing faces. The gravitational forces acting upon the respective tires are designated by forces $G_1$, $G_2$, $G_3$, and $G_4$ Hence, the coordinates of the said tires are $x_1$, $y_1$ through $x_4$, $y_4$.

FIG. 1b schematically shows a side view of the same vehicle. In addition, the position of an imaginary center of gravity SP is drawn therein. The total gravitational force G acts upon the said center of gravity.

The vehicle mass can be determined, in a simple way, by summing up the individual gravitational forces acting upon the wheels and by dividing the sum by the gravitational acceleration g:

$$m = \frac{G_1 + G_2 + G_3 + G_4}{g}$$

The coordinates of the center of gravity in the wheel bearing plane can, therefore, be determined by the following equations:

$$x_{sp} = \frac{G_1 x_1 + G_2 x_2 + G_3 x_3 + G_4 x_4}{G_1 + G_2 + G_3 + G_4}$$

$$y_{sp} = \frac{G_1 y_1 + G_2 y_2 + G_3 y_3 + G_4 y_4}{G_1 + G_2 + G_3 + G_4}$$

The coordinate of the center of gravity extending in a direction normal to the wheel bearing plane can be determined, for example, by measuring the lateral forces applied in defined driving through a curve.

A known general mass distribution can underly a mass distribution model, for a given vehicle, which is assumed for the position of engine, gear box, body and other accessories.

Based on the afore-mentioned basic mass distribution it is possible to compute a variable mass distribution from the forces acting upon the individual wheels and not restricted to the gravitational forces, taking into account variable masses applied to the vehicle. Additional loads on the individual tires are then converted into masses which are then applied, in the mass distribution model, to the seats, luggage compartment and/or roof rack. These additional masses at the typical locations for variable additional loading can form both physically finite expansions or mass points. If the additional masses are located within the outer contour of the vehicle, approximation by point masses is advisable as the behavior of the inertia of finite bodies compared to the entire vehicle is not different from that of the inertia of pointed masses. It is only masses located externally of the outer contour of the vehicle that should, if possible, be approximated by physically finite expansions because the aerodynamic drag of the automotive vehicle and other values could also change with an increasing expansion of the masses. For example, in a very high piling of a roof rack loading, the center of gravity of the vehicle is shifted upwardly.

Figure 2:
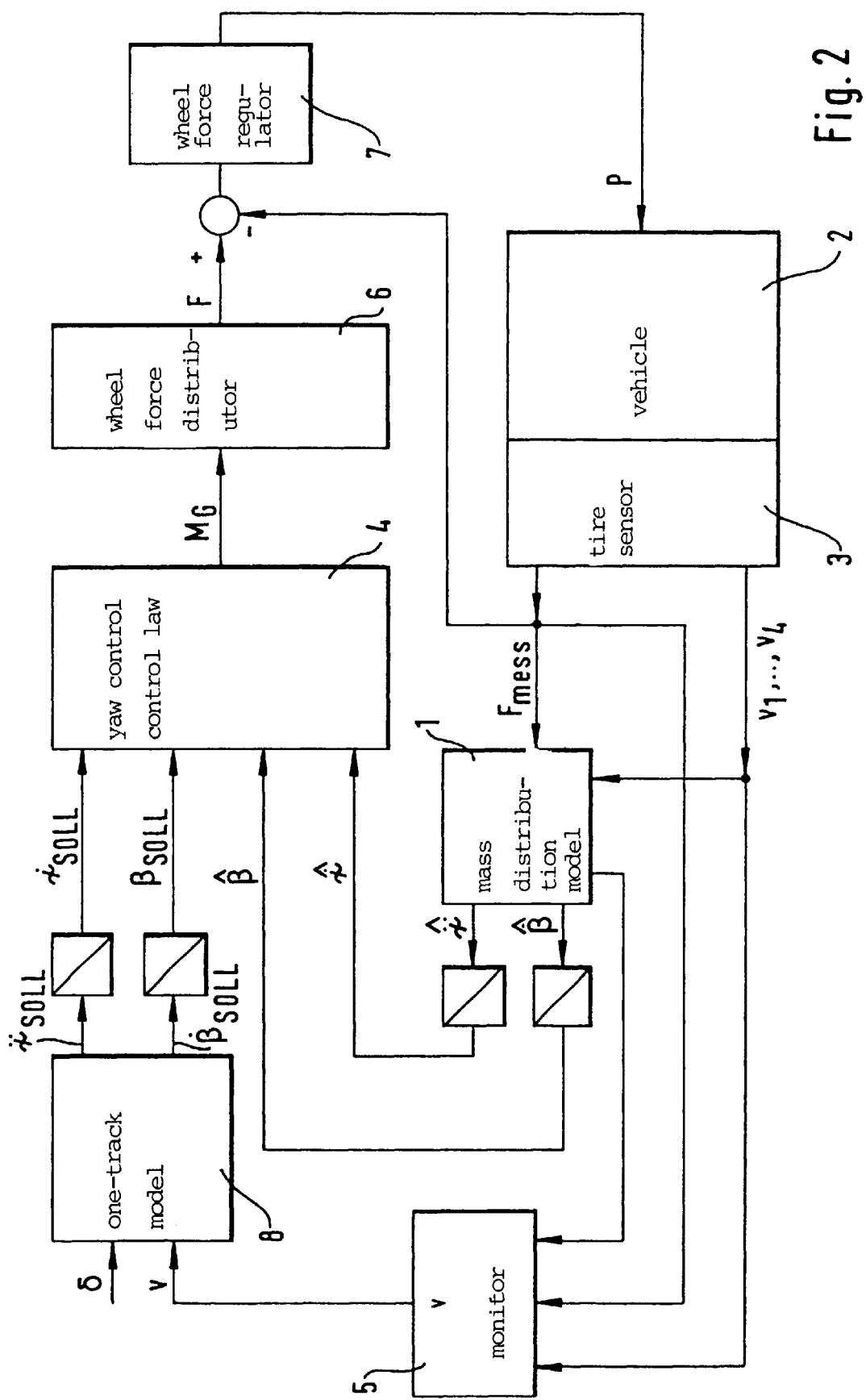
FIG. 2 shows a form of embodiment of the process of the invention for controlling the yawing moment of an automotive vehicle.

According to FIG. 2, a mass distribution model 1 of this type is incorporated into a process for controlling the driving stability in the sense of a yawing moment control. The control distance of the control process is formed by vehicle 2 which is provided with tire sensors. The said tire sensing system 3 detects the individual wheel loads as well as lateral and torsional forces applied to the individual tires. In addition, the speeds $v_1$ through $v_4$ of the individual wheels will be detected. These can also be determined by a suitable tire sensing system or by conventional wheel sensors. The individual wheel speeds $v_1$ through $V_4$ as well as the measured forces such as wheel loads, transverse forces and longitudinal forces on the individual wheels, are incorporated into the mass distribution model 1. The yawing angle acceleration and the speed of the side slip angle of the automotive vehicle can be determined by way of such a mass distribution pattern with no need of relying on an additional yaw rate sensor signal or a transverse acceleration signal, thereby simplifying and economizing the sensing system of the automotive vehicle.

By integration in relation to time, the yaw rate $\psi$ and the side slip angle $\beta$ of the vehicle are calculated from the yaw angle acceleration and the speed of the side slip angle. They are integrated as actual conditions into a known per se yaw moment control formula 4.

The nominal preset values for the control are calculated in a different way. The speeds of the individual wheels, in a speed monitor 5, are converted into a vehicle reference speed v. A linear one-track model 8 calculates from the said reference speed v and the steering lock angle δ of the front wheels target values for the side slip angle speed and the yaw angle acceleration. Also these values are integrated into preset nominal values for the yaw rate $\psi$ and the side slip angle $\beta$ of the vehicle.

Alternatively, the respective yaw angle accelerations and side slip angle speeds could be directly compared to one another and processed according to the yawing moment control formula 4.

However, in the present example, the side slip angles and the yaw rates are thus compared to one another and converted into a nominal yaw moment $M_G$ to be applied. The said nominal yaw moment $M_G$ to be applied is then converted in a wheel force distributor 6 into wheel forces F to be applied to the individual wheels. These forces are nominal forces. The actual forces correspond to the measured forces $F_{mess}$ that are detected by the tire sensors 3. By forming the difference between the nominal forces F and the actual forces $F_{mess}$, the individual differential forces are, for example, computed in a wheel force regulator 7 into brake pressures which, in turn, act upon the vehicle 2 resulting in new changed force conditions and wheel speeds on the individual tires.

The special feature of the invention resides in that, thanks to detecting the force and moment on the individual tires, an expensive sensing system can be foregone, enabling a rapid detection of the momentary condition of the vehicle. Consequently, the measured forces $F_{mess}$ are directly incorporated into the calculation for forming the difference over the detected nominal forces F without requiring any further processing, thereby enabling a fast response of the wheel force regulator 7.

What is claimed is:

1. A process for controlling the driving behavior of an automotive vehicle provided with tire sensors that determine the measured forces ($F_{mess}$) applied to the vehicle tires, comprising the steps of:

determining the measured forces applied to each vehicle tires;

determining variable masses applied to the vehicle by converting the forces applied to each of the tires into masses and applying the variable masses to a stored mass distribution model, said mass distribution model including basic mass distribution of the vehicle, actual vehicle mass and mass point of gravity location, whereby the addition of the variable masses is to variable loading sites within the mass distribution model; and determining the variable center of gravity, the yaw rate and the side slip angle of the vehicle using the mass distribution model and controlling the driving behavior of the vehicle based on the determined variable center of gravity, the determined yaw rate and the determined side slip angle.

2. The process according to claim 1, wherein the variable masses at the variable loading sites in the mass distribution model are approximated as points of mass.

3. The process according to claim 2, wherein said points of mass represent points of gravity of at least one of a driver, a passenger, a luggage compartment load and a roof load.

4. The process according to claim 2, wherein at least one of the yaw speed ($\psi$), the side slip angle ($\beta$), a time-related derivative of the yaw speed and a time derivative of the slip angle is calculated from the mass distribution model.

5. The process according to claim 4, wherein the actual driving behavior of the automotive vehicle is determined from the mass distribution model and the nominal driving behavior calculated from a linear one-track model.

6. The process according to claim 1, wherein at least one of the variable masses at the variable loading sites in the mass distribution model is applied as a body of finite expansion.

* * * * *